US006971412B2

(12) United States Patent
Maas et al.

(10) Patent No.: US 6,971,412 B2
(45) Date of Patent: Dec. 6, 2005

(54) METHOD FOR FIXING A FLEXIBLE ELEMENT IN A TUBE WITH TIGHT FITTING AND ASSEMBLY FOR USE IN THIS METHOD

(75) Inventors: Wilhelmus Johannes Joseph Maas, Someren (NL); Petrus Lambertus Wilhelmus Hurkmans, Someren (NL)

(73) Assignee: AFA Polytek B.V., Helmond (NL)

( * ) Notice: Subject to any disclaimer, the term of this patent is extended or adjusted under 35 U.S.C. 154(b) by 154 days.

(21) Appl. No.: 10/451,591

(22) PCT Filed: Dec. 24, 2001

(86) PCT No.: PCT/NL01/00941

§ 371 (c)(1),
(2), (4) Date: Jun. 23, 2003

(87) PCT Pub. No.: WO02/052189

PCT Pub. Date: Jul. 4, 2002

(65) Prior Publication Data

US 2004/0231739 A1   Nov. 25, 2004

(30) Foreign Application Priority Data

Dec. 22, 2000   (NL) .................................. 1016976

(51) Int. Cl.[7] .............................................. F16L 55/16
(52) U.S. Cl. ........................................ 138/98; 285/55
(58) Field of Search ...................... 138/97, 98; 285/55

(56) References Cited

U.S. PATENT DOCUMENTS 591,828 A    10/1897  Duncan
3,179,168 A * 4/1965  Vincent ...................... 166/277
3,388,931 A * 6/1968  Johnson et al. ......... 285/137.11
3,462,825 A * 8/1969  Pope et al. ..................... 29/451
3,971,574 A   7/1976  Curtin
4,619,555 A * 10/1986 Skinner et al. ........... 405/184.2
4,793,382 A * 12/1988 Szalvay ........................ 138/98
5,048,174 A * 9/1991  McGuire ....................... 29/451
6,240,612 B1 * 6/2001 McGuire .................. 29/402.02

FOREIGN PATENT DOCUMENTS

FR          1245751          3/1960

* cited by examiner

Primary Examiner—James Hook
(74) Attorney, Agent, or Firm—Brooks Kushman P.C.

(57) ABSTRACT

The invention relates to a method for fixing a relatively flexible element (3) in a tube (2) with tight fitting, by arranging around the flexible element a co-displacing member (5) which encloses this element, and forcing the co-displacing member into the tube while co-displacing therewith the flexible element. The co-displacing member can herein be releasably connected to the tube or the flexible element, and the connection can be broken when the co-displacing member is forced into the tube. The invention also relates to an assembly of a tube and a relatively flexible element for receiving therein with tight fitting, for use in such a method, which is provided with a co-displacing member for arranging around the flexible element and enclosing this element. The co-displacing member can be releasably connected to the tube or the flexible element, for instance be formed integrally with the tube, wherein a weakened portion (6) is then formed between the tube and the co-displacing member. The tube can further have a widened end part (4), the inner diameter of which corresponds with the outer diameter of the co-displacing member arranged round the flexible element.

22 Claims, 2 Drawing Sheets

Figure 1:
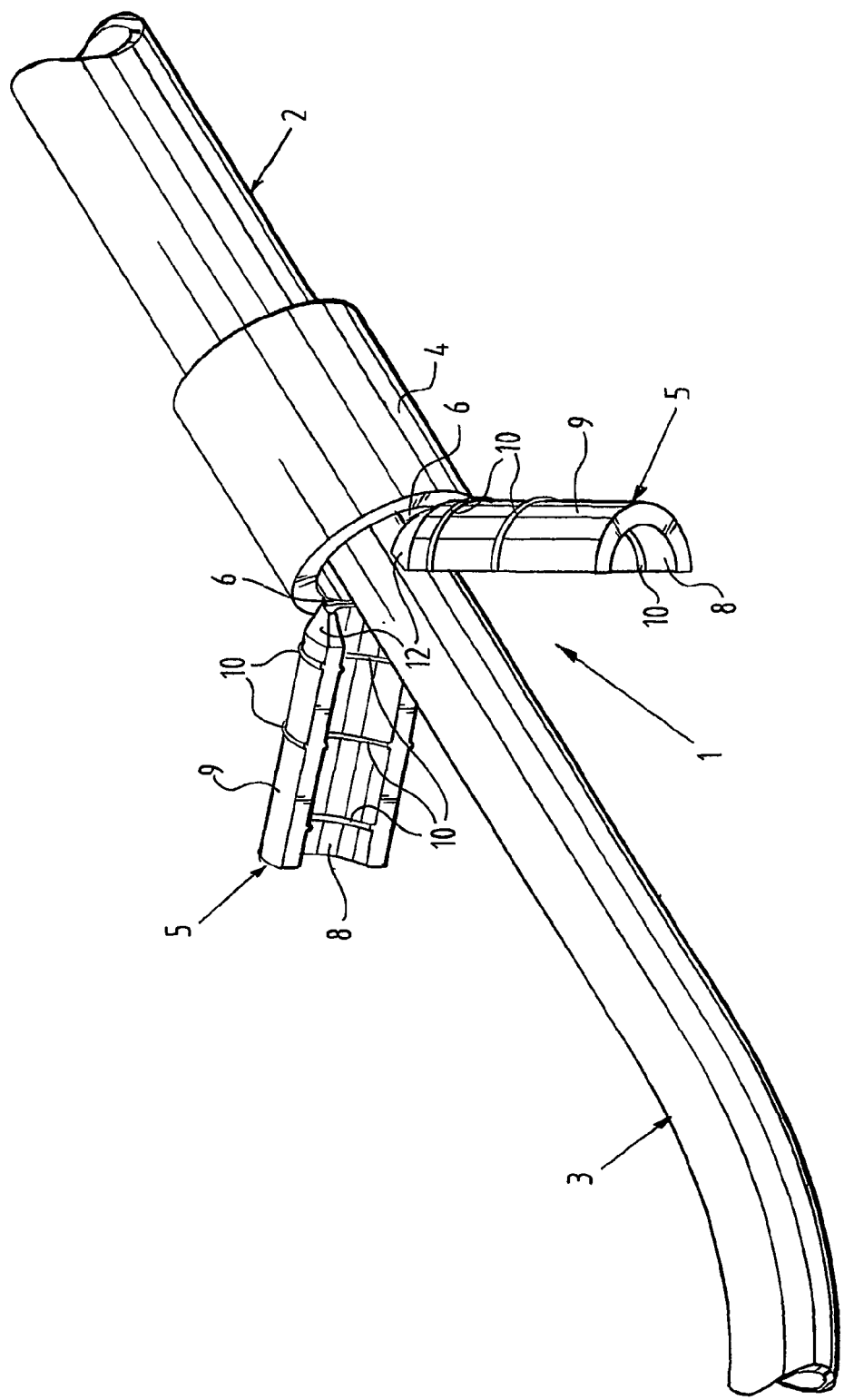

METHOD FOR FIXING A FLEXIBLE ELEMENT IN A TUBE WITH TIGHT FITTING AND ASSEMBLY FOR USE IN THIS METHOD

The invention relates to a method for fixing a relatively flexible element in a tube with tight fitting.

When a relatively flexible element, for instance a thin-walled plastic hose, has to be fixed in a tube in leakage-free manner, problems usually occur. A tight fit is after all required for a leakage-free fixing, but the friction force occurring when the hose is pushed into the tube is hereby relatively high. The hose will therefore have to be pressed into the tube with force, but there will be the risk here of the hose bending or being compressed, whereby the passage is narrowed or even completely obstructed.

The invention now has for its object to propose a method wherein this problem does not occur. According to the invention this is achieved by a method which comprises the steps of arranging around the flexible element at least one co-displacing member which at least partly encloses the flexible element, and forcing the at least one co-displacing member into the tube while co-displacing therewith the flexible element. By making use of a co-displacing member which is also pressed into the tube a relatively great force can be exerted on the flexible element without it buckling or otherwise being deformed.

In preference the at least one co-displacing member is herein releasably connected to the tube or the flexible element, and the connection is broken when the at least one co-displacing member is forced into the tube. Thus is ensured that the tube is always provided with one or more co-displacing members.

When the tube has a widened end part, an outer end of the flexible element is advantageously inserted into this end part and the at least one co-displacing member is arranged round the flexible element outside the end part and then forced into the widened end part, wherein the outer end of the flexible element is co-displaced into the tube beyond the widened end part thereof. The co-displacing member can thus be received in the tube without the flexible element thereby being deformed.

The invention also relates to an assembly of a tube and a relatively flexible element for receiving therein with tight fitting, for use in the method as described above. Such an assembly is characterized according to the invention by at least one co-displacing member for arranging around the flexible element and at least partly enclosing this element. The at least one co-displacing member herein advantageously has an inner periphery corresponding with the outer periphery of the flexible element, thereby ensuring the largest possible contact area between the co-displacing member and the flexible element.

The assembly is preferably provided with means for increasing the friction arranged on the inner periphery of the at least one co-displacing member, so that a relatively great force can be exerted on the flexible element without the co-displacing member sliding over the element.

In order to ensure that one or more co-displacing members are always available, the at least one co-displacing member is advantageously releasably connected to the tube or the flexible element. It is recommended here that the at least one co-displacing member is formed integrally with the tube, and a weakened portion is formed between the tube and the at least one co-displacing member. The or each co-displacing member can thus be manufactured from a stronger material than the flexible element and still be broken off easily.

In order to enable receiving of the co-displacing member in the tube without deforming the flexible element, the tube preferably has a widened end part. Advantageously the inner diameter of the widened end part of the tube is herein at least equal to the outer diameter of the at least one co-displacing member in its position arranged round the flexible element, so that no extra friction is generated by the co-displacing member. In order to secure the co-displacing member in the widened part in reliable manner, means are however preferably arranged on the outer periphery thereof for the purpose of increasing the friction.

When a transition portion with gradually decreasing inner diameter is formed between the widened end part and the main body of the tube fitting tightly round the flexible element, the outer end of the flexible element can be readily guided into the main body of the tube.

Figure 2:
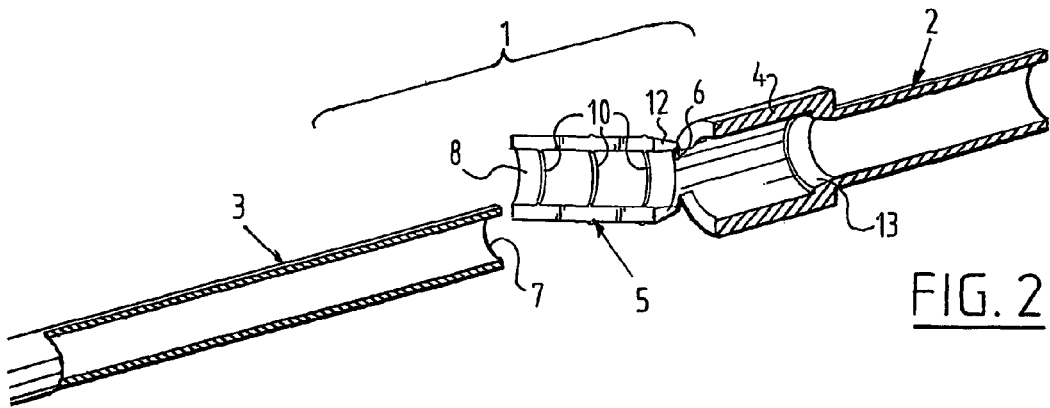
Figure 3:
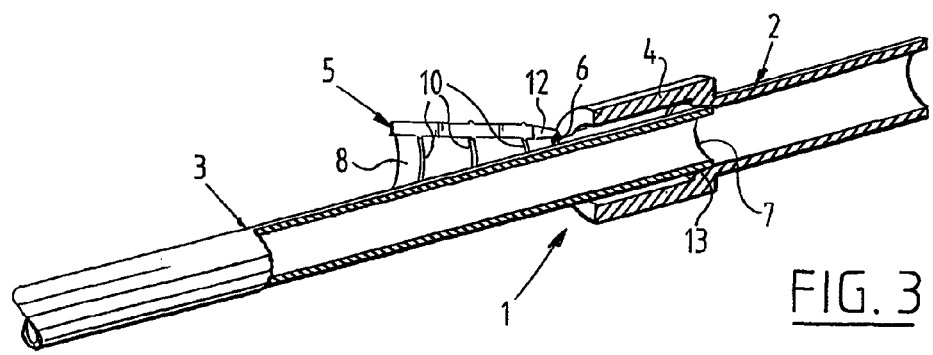
Figure 4:
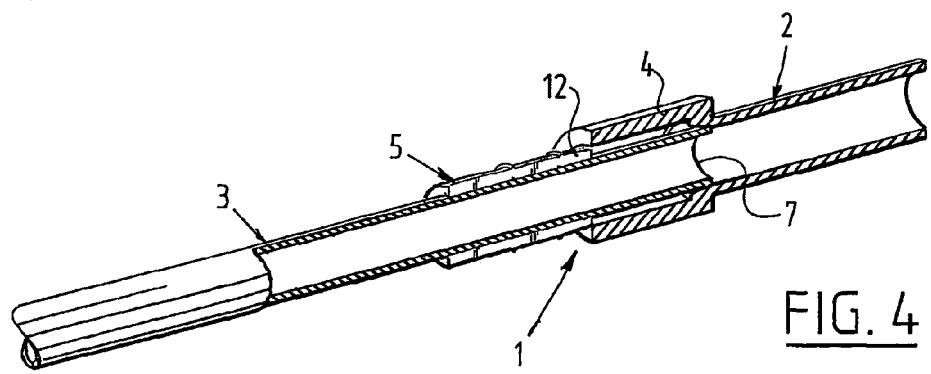
Figure 5:
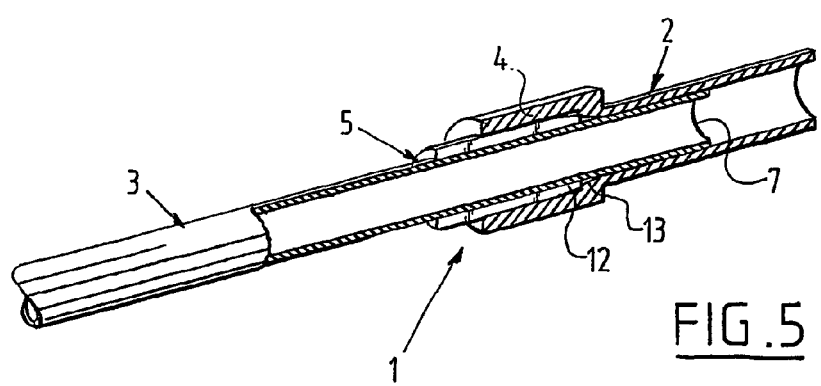

The invention will now be elucidated on the basis of an embodiment, wherein reference is made to the annexed drawing, in which:

FIG. 1 is a perspective view of the assembly according to the invention,

FIG. 2 is a perspective cross-sectional view of the assembly prior to fixing of the flexible element in the tube, FIG. 3 shows a view corresponding with FIG. 2 of the first step of the fixing, wherein the outer end of the flexible element is inserted into the tube, FIG. 4 is a view corresponding with FIGS. 2 and 3 of the second step of the fixing, wherein the co-displacing member is clamped round the flexible element, and FIG. 5 is a view corresponding with FIGS. 2 to 4 of the final step of the fixing, wherein the co-displacing member is inserted into the widened end part of the tube, co-displacing therewith the flexible element.

An assembly 1 according to the invention consists of a tube 2 and a flexible element 3, here a relatively thin-walled plastic hose. Tube 2 is provided with a widened end part 4. Fixed to this end part 4 are two co-displacing members 5, the inner periphery of which corresponds with the outer periphery of hose 3.

In the shown embodiment the co-displacing members 5 are formed integrally with tube 2, for instance by injection moulding, and a weakened portion 6 is formed between each co-displacing member 5 and tube 2. In the shown embodiment the co-displacing members are also directed slightly outward, whereby the leading end 7 of hose 3 can be placed simply between co-displacing members 5 into the widened end part 4 of tube 2. On both their inner side 8 and their outer side 9 the co-displacing members 5 are provided with means for increasing friction, for instance in the form of peripheral edges 10. The side 12 of each co-displacing member 5 connected to tube 2 takes a slightly tapering form so that co-displacing member 5 can be inserted relatively easily into tube 2, as elucidated below.

Between the widened part 4 and the main body of tube 2, the internal diameter of which is slightly smaller than the external diameter of hose 3, is formed a transition portion 13 with a gradually decreasing internal diameter. This transition portion 13 ensures a good guiding of the leading end 7 of hose 3 when this latter is inserted into the main body of tube 2.

Insertion of flexible hose 3 into tube 2 now proceeds as follows. The leading end 7 of hose 3 is inserted into the widened end part 4 of tube 2 until it comes into contact with transition portion 13. Co-displacing members 5 are then pressed together until they grip in close-fitting manner with their inner side 8 round hose 3. The edges 10 herein provide a firm grip on the outer surface of hose 3. As the co-displacing members 5 are swung inward the weakened portions 6 will be weakened even further by the deformation which occurs.

When a force directed toward tube 2 is now exerted on co-displacing members 5, these latter are pressed into the widened part 4 of tube 2, wherein the weakened portions 6 will fail. Owing to the friction between co-displacing members 5 and hose 3, this latter is carried along, wherein the leading end 7 thereof is pressed into the main body of tube 2. Hose 3, which in any case has a slightly larger diameter than tube 2, is compressed slightly and a seal is formed between hose 3 and tube 2.

Because the end part 4 of tube 2 is widened, co-displacing members 5 can be received therein without hose 3 being pressed closed thereby. The edges 10 on the outer side 9 of co-displacing members 5 herein ensure that these latter remain firmly fixed in tube 2.

Because the force with which the hose 3 is moved forward is exerted very closely to the leading end 7 thereof and is moreover transferred evenly and over a relatively large surface to hose 3, this latter will not buckle, collapse or otherwise deform. The whole inner diameter of hose 3 therefore remains available as throughflow passage.

The above described operations can be automated in relatively simple manner, whereby a high productivity can therefore be achieved.

Although the invention is described above on the basis of one embodiment, it will be apparent that it is not limited thereto. Flexible elements other than the shown hose could thus also be inserted in a tube in the manner described. Instead of being pushed into a tube, the flexible element could also be pushed into another similar opening. The sectional form of the tube and the flexible element can further be varied, as can the configuration of the co-displacing members and their number. The scope of the invention is therefore defined solely by the appended claims.

What is claimed is:

1. Method for connecting an end of a relatively flexible tubular element and an end of a tube in a locally overlapping tight fitting manner, characterized by the steps of:
   arranging around the flexible tubular element at least one co-displacing member which at least partly encloses the flexible element; and
   forcing the at least one co-displacing member into the tube while co-displacing therewith the flexible element to form a locally overlapping connection with non-overlapping sections of the flexible tubular element and the tube extending from opposite ends of an overlapping connection formed thereby.

2. Method as claimed in claim 1, characterized in that the at least one co-displacing member is releasably connected to the tube or the flexible element, and the connection is broken when the at least one co-displacing member is forced into the tube.

3. Method as claimed in claim 2, characterized in that the tube has a widened end part, an outer end of the flexible element is inserted into this end part and the at least one co-displacing member is arranged round the flexible element outside the end part and then forced into the widened end part, wherein the outer end of the flexible element is co-displaced into the tube beyond the widened end part thereof.

4. Method as claimed in claim 1 characterized in that the tube has a widened end part, an outer end of the flexible element is inserted into this end part and the at least one co-displacing member is arranged round the flexible element outside the end part and then forced into the widened end part, wherein the outer end of the flexible element is co-displaced into the tube beyond the widened end part thereof.

5. Assembly of a tube and a relatively flexible element for receiving therein with tight fitting, for use in the method as claimed in claim 1, characterized by at least one co-displacing member for arranging around the flexible element and at least partly enclosing this element.

6. Assembly as claimed in claim 5, characterized in that the at least one co-displacing member has an inner periphery corresponding with the outer periphery of the flexible element.

7. Assembly as claimed in claim 6 characterized in that the at least one co-displacing member is releasably connected to the tube or the flexible element.

8. Assembly as claimed in claim 6, characterized in that the tube has a widened end part.

9. Assembly as claimed in claim 5 characterized in that the at least one co-displacing member is releasably connected to the tube or the flexible element.

10. Assembly as claimed in claim 9, characterized in that the tube has a widened end part.

11. Assembly as claimed in claim 5 characterized in that the tube has a widened end part.

12. Assembly as claimed in claim 11 characterized by a transition portion with gradually decreasing inner diameter formed between the widened end part and the main body of the tube fitting tightly round the flexible element.

13. Assembly as claimed in claim 11, characterized in that the inner diameter of the widened end part of the tube is at least equal to the outer diameter of the at least one co-displacing member in its position arranged round the flexible element.

14. Assembly as claimed in claim 13, characterized by means for increasing the friction arranged on the outer periphery of the at least one co-displacing member.

15. Assembly as claimed in claim 13 characterized by a transition portion with gradually decreasing inner diameter formed between the widened end part and the main body of the tube fitting tightly round the flexible element.

16. Method for connecting an end of a relatively flexible tubular element and an end of a tube in a locally overlapping tight fitting manner, characterized by the steps of:
   arranging around the flexible tubular element at least one co-displacing member having an inner periphery corresponding with the outer periphery of the flexible tubular element which is arranged around and at least partly encloses the flexible tubular element;
   forcing the at least one co-displacing member into the tube while co-displacing therewith the flexible element to form a locally overlapping connection with non-overlapping sections of the flexible tubular element and the tube extending from opposite ends of the overlapping connection formed thereby; and
   wherein the co-displacing member is provided with means for increasing the friction arranged on the inner periphery of the at least one co-displacing member.

17. Assembly as claimed in claim 16 characterized in that the at least one co-displacing member is releasably connected to the tube or the flexible element.

18. Assembly as claimed in claim 16, characterized in that the tube has a widened end part.

19. Method for connecting an end of a relatively flexible tubular element and an end of a tube in a locally overlapping tight fitting manner, characterized by the steps of:
- arranging around the flexible tubular element at least one co-displacing member which at least partly encloses the flexible element has an inner periphery corresponding with the outer periphery of the flexible element, and;
- forcing the at least one co-displacing member into the tube while co-displacing therewith the flexible element to form a locally overlapping connection with non-overlapping sections of the flexible tubular element and the tube extending from opposite ends of an overlapping connection formed thereby;
- wherein the at least one co-displacing member is formed integrally with the tube, and a weakened portion is formed between the tube and the at least one co-displacing member.

20. Assembly as claimed in claim 19, characterized in that the tube has a widened end part.

21. Method for connecting an end of a relatively flexible tubular element and an end of a tube in a locally overlapping tight fitting manner, characterized by the steps of:
- arranging around the flexible tubular element at least one co-displacing member which at least partly enclose the flexible tubular element;
- forcing the at least one co-displacing member into the tube having a widened end part while co-displacing therewith the flexible element to form a locally overlapping connection with non-overlapping sections of the flexible tubular element and the tube extending from opposite ends of an overlapping connection formed thereof;
- wherein the co-displacing member is provided with means for increasing friction arranged on the outer periphery of the at least one co-displacing member.

22. Assembly as claimed in claim 21 characterized by a transition portion with gradually decreasing inner diameter formed between the widened end part and the main body of the tube fitting tightly round the flexible element.

* * * * *